United States Patent
Supriya et al.

(10) Patent No.: US 9,101,931 B2
(45) Date of Patent: Aug. 11, 2015

(54) CONTROLLED FLUID DELIVERY IN A MICROELECTRONIC PACKAGE

(75) Inventors: Lakshmi Supriya, Chandler, AZ (US); James C. Matayabas, Jr., Chandler, AZ (US); Nirupama Chakrapani, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 1042 days.

(21) Appl. No.: 11/966,560

(22) Filed: Dec. 28, 2007

(65) Prior Publication Data
US 2009/0169427 A1     Jul. 2, 2009

(51) Int. Cl.
  *B01J 19/00* (2006.01)
  *B01L 3/00* (2006.01)
  *B29C 65/00* (2006.01)

(52) U.S. Cl.
  CPC .. *B01L 3/502707* (2013.01); *B01J 2219/00527* (2013.01); *B01J 2219/00605* (2013.01); *B01J 2219/00619* (2013.01); *B01L 2200/025* (2013.01); *B01L 2300/089* (2013.01); *B01L 2300/0816* (2013.01); *B01L 2300/0819* (2013.01); *B01L 2300/0822* (2013.01); *B01L 2300/0867* (2013.01); *B01L 2300/16* (2013.01); *B01L 2300/161* (2013.01); *B01L 2300/165* (2013.01); *B01L 2400/0406* (2013.01); *B01L 2400/0688* (2013.01)

(58) Field of Classification Search
  USPC .......................... 422/400–402, 502–503, 68.1
  See application file for complete search history.

(56) References Cited

U.S. PATENT DOCUMENTS

| | | | | |
|---|---|---|---|---|
| 7,351,323 | B2 * | 4/2008 | Iketaki et al. | 205/777.5 |
| 2001/0055529 | A1 * | 12/2001 | Wixforth | 417/53 |
| 2003/0087292 | A1 * | 5/2003 | Chen et al. | 435/6 |
| 2003/0111714 | A1 * | 6/2003 | Bates et al. | 257/678 |
| 2003/0198968 | A1 * | 10/2003 | Matson | 435/6 |
| 2006/0088666 | A1 * | 4/2006 | Kobrin et al. | 427/569 |
| 2006/0207789 | A1 * | 9/2006 | Soeta | 174/260 |
| 2006/0214246 | A1 * | 9/2006 | Garcia | 257/415 |
| 2007/0071789 | A1 * | 3/2007 | Pantelidis et al. | 424/423 |
| 2007/0087187 | A1 * | 4/2007 | Lu et al. | 428/323 |
| 2007/0166513 | A1 * | 7/2007 | Sheng et al. | 428/141 |
| 2007/0287191 | A1 * | 12/2007 | Stiene et al. | 436/150 |
| 2008/0070349 | A1 * | 3/2008 | Matayabas et al. | 438/121 |
| 2008/0122118 | A1 * | 5/2008 | Basheer et al. | 257/778 |
| 2008/0199362 | A1 * | 8/2008 | Chong et al. | 422/100 |
| 2009/0065932 | A1 * | 3/2009 | Sane et al. | 257/737 |
| 2009/0114293 | A1 * | 5/2009 | Kanai et al. | 137/561 R |
| 2009/0130766 | A1 * | 5/2009 | Weekamp | 436/63 |

* cited by examiner

*Primary Examiner* — Jennifer Wecker
(74) *Attorney, Agent, or Firm* — Jordan IP Law, LLC

(57) ABSTRACT

A microelectronic package includes a die which may include MEMS and CMOS circuitry for analyzing a fluid. A defined path is provided for channeling fluid to the die. Rather than patterning depressions or physical channels in the package substrate, the defined paths comprise coatings that may channel the flow of liquids to the die for biological sensor type applications. The defined paths may comprise a wetting coating that has an affinity to fluids. Similarly, the defined paths may comprise a dewetting coating the tend to repel fluid surrounding the paths.

18 Claims, 2 Drawing Sheets

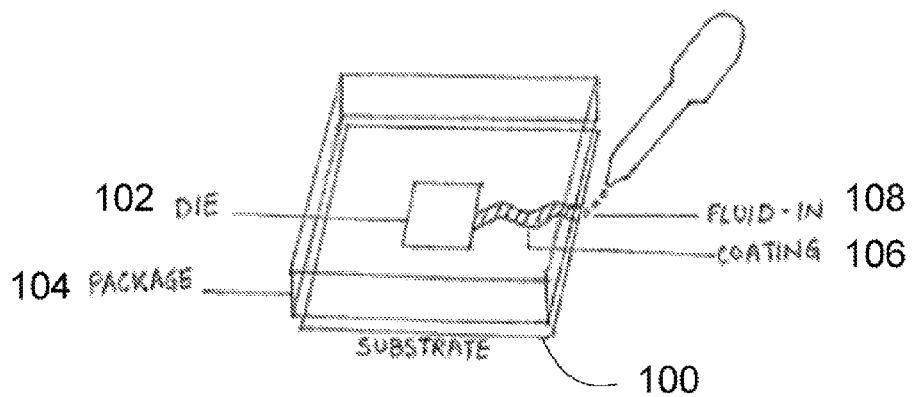
Fig. 1
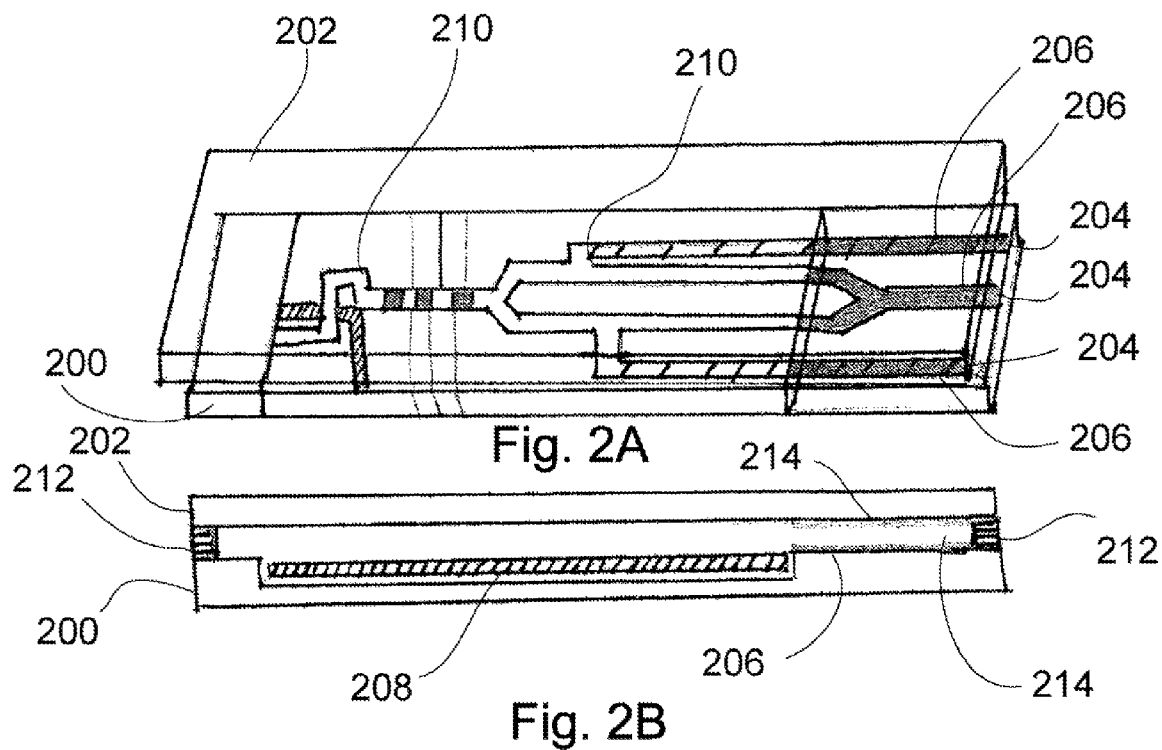
Fig. 2A
Fig. 2B

US 9,101,931 B2

CONTROLLED FLUID DELIVERY IN A MICROELECTRONIC PACKAGE

FIELD OF THE INVENTION

Embodiments of the present invention relate to fluid delivery and, more particularly to micro-fluid delivery to a silicon die for example, for biological sensor applications.

BACKGROUND INFORMATION

Recently, there has been a growing interest for those in the health fields for developing biosensors, molecular libraries, Lab-on-a-Chip (LOC) and other biological electronic and bio-MEMS based devices. Lab-on-a-chip (LOC) refers to devices that integrate multiple laboratory functions on a single chip. Such chips are capable of managing extremely small volumes of fluid, for example, in the range of pico-liters or less. LOC generally involves the scaling of single or multiple lab processes down to chip-format to perform chemical analysis. Many uses are possible for LOC devices such as immunoassays to detect bacteria, viruses and cancers based on antigen-antibody reactions, dielectrophoresis for detecting cancer cells and bacteria, or blood sample analysis.

Controlled fluid delivery to a semiconductor die is of utmost importance for such biological sensor applications. Generally this delivery involves creating physical channels or trenches in a substrate in which the fluid may travel to reach the die where chemical analysis may be performed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1 is a plan view of a microelectronic package or lab on a chip (LOC) according to one embodiment of the invention;

FIG. 2A is a plan view of the microelectronic package illustrating the microfluidic circuitry according to an embodiment;

FIG. 2B is a side view of the package shown in FIG. 2A;

DETAILED DESCRIPTION

Figure 3A:
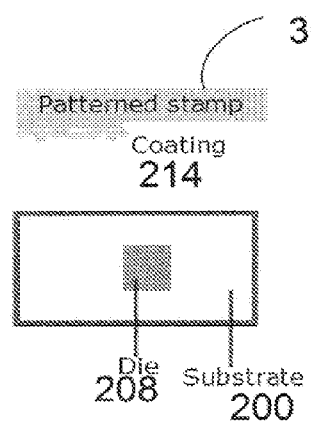
FIGS. 3A, 3B, and 3C show the steps for patterning the wetting/dewetting coatings to form the fluid flow channels within the package.

Described is a microelectronic packaging scheme for controlling the delivery of fluids to one or more silicon devices which may comprise biological sensors, molecular libraries, MEMS devices and/or other applications involving interaction with a fluid. Embodiments eliminate the need for creating physical channels via methods such as milling, etching, etc. in the package with the ability to deliver controlled amounts of fluids to a chip for biological applications. Embodiments enable rapid, low cost assembly of packaging comprising complex microfluidics control. Embodiments also enable the use of clear quartz, polyester, or polycarbonate lids or covers which provide access to the silicon device for inspection by visual and/or spectrometric methods, such as UV light, IR light, laser, etc.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Referring now to FIG. 1, there is shown a simplified view of a Lab on Chip (LOC) according to one embodiment. In its simplest form the LOC comprises a substrate 100 including a die 102, which may include MEMS and CMOS circuitry for analyzing a fluid, a package cover 104, a coating defining a path 106 in which a fluid may travel to reach the die 102, and a fluid delivery mechanism 108. Here the fluid deliver mechanism 108 is shown as a simple dropper. However, the fluid deliver mechanism may also be a pump or MEMS device which may or may not be integral with the LOC.

Rather than patterning depressions or physical channels in the substrate 100, the defined paths 106 comprise coatings that may channel the flow of liquids to the die 102 for biological sensor type applications or other applications. The defined paths 106 may be coated with a wetting coating that has an affinity to fluids. Similarly, areas on the substrate 100 and package cover 104 not in the defined path may have a dewetting coating that tends to repel fluids.

Referring now to FIGS. 2A and 2B, there is shown a plan view and a side view, respectively, of one embodiment of the intention. The device may comprise a substrate 200 and a cover 202 to fit over the substrate 200. One or more fluid inlets 204 may be provided on an edge of the substrate 200 into which a fluid may be introduced. In addition, one or more microfluidic channels 206 may be patterned adjacent to the fluid inlets 204 to carry the fluid to a die 208.

The die 208 may comprise various microfluidic circuitry 210 that may comprise various CMOS and MEMS devices for analyzing the fluid. Spacers 212 may be provided between the cover 202 and the substrate 200 to allow clearance for the fluid to move. The fluid may move by capillary action through the microfluidic channels 206 to the die 208. As best shown in FIG. 2B, the channels 206 may comprise a wetting fluid coating 214 stamped or otherwise patterned on the substrate 200 and the cover 202.

A wide variety of fluids may be used such as water, alcohols, solvents such as toluene, acetone etc. containing the biological molecules. The substrate 200 or cover 202 may comprise glass, quartz, ceramic, organics etc. such that it is optically, UV, or IR transparent, or electrically/thermally conductive to allow detection of biomolecules or allowing detection by any other methods known in the art.

Examples of useful wetting coatings 206 include monolayers, such as trimethoxysilane surfactants thiol surfactants, alcohol surfactants, and the like. Similarly, dewetting materials such as silica, titania and the like, may be used outside the channels 206 which are neat, dispersed in solvents or in a polymer matrix such as epoxy, polyimide, polyester etc. A wide variety of methods may be used to place the dewetting/wetting coating in the desired locations, including subtractive methods, such as UV lithography, additive methods, such as soft lithography, and other methods known in the art.

Figure 3B:
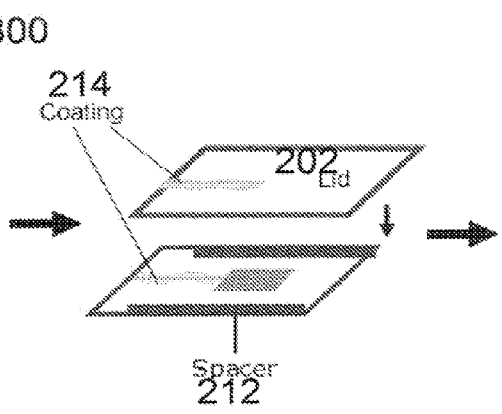
Figure 3C:
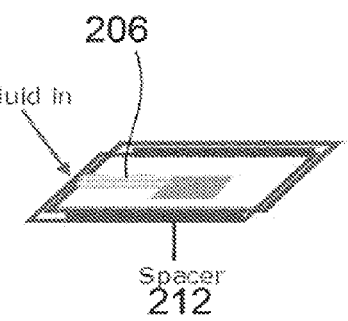

FIGS. 3A, 38, and 3C illustrate a method for producing an embodiment of the invention. As shown in FIG. 3A, the die 208 is located in the substrate 200. A patterned stamp 300 containing the wetting/dewetting coating 214 may be used to stamp or otherwise place the coating 214 onto the substrate 200 in the desired pattern for form the channel or flow path 206. Likewise a stamp 300 may produce a corresponding patterned coating 214 on the cover or lid 202 as shown in FIG. 3B. Placement of the top lid or cover 202, analogously patterned with a corresponding flow path 206 is separated from the substrate 200 by a spacer 212.

The substrate 200 may be designed such that there is a hollow etched in to create a space for the die 208 such that the die 208 is flush with the top of the substrate 200. The microfluidic channels 210 in the die 208 then line up with the channels on the substrate 200.

In one embodiment of the invention, the dewetting coating is a nanocomposite comprising silica nanoparticles in epoxy resin. The coating is placed on the substrate using a patterned stamp 300 in regions where fluid flow is not desired. An analogous coating is placed on another substrate which will act as the top surface. This surface is placed on the bottom substrate with a spacer 212 in between.

In another embodiment of the invention, the dewetting coatings are alkoxysilanes such as octadecyltrichlorosilane, heptadecafluoro 1,1,2,2, tetrahydrodecyl trichlorosilane and alkanethiolates such as n-alkanethiol. The microfluidic channel is achieved by selective UV degradation of the coating or by using a patterned stamp inked with the coating and stamping onto the substrate, or by other methods known in the art.

In another embodiment of the invention wetting coatings such as nanoparticles such as silica, titania, etc. neat or dispersed in solution, nanocomposites such as functionalized silica in epoxy resin etc. or carboxylic acid terminated silanes etc. are utilized. The coatings are stamped onto the substrate using a patterned stamp such that the coatings in this case comprise the microfluidic channel.

It is apparent to those skilled in the art that the microelectronic packages of this invention may comprise multiple channels or channels comprising complex pattern for splitting the fluid sample. If desired, additional fluid flow control devices may be incorporated into the package of this invention, including gates pumps, suction, and the like.

Figure 4A:
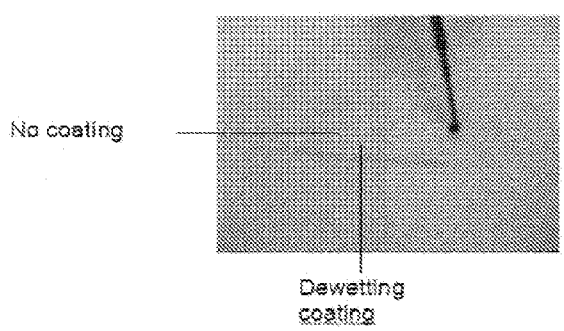
FIGS. 4A and 4B show an experiment using microscope slides to demonstrate the viability of using wetting/dewetting coatings to form fluid flow channels.
Figure 4B:
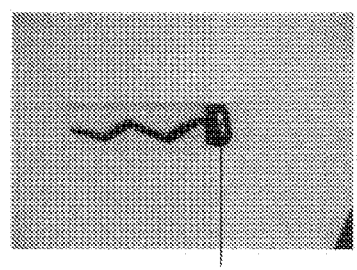

FIGS. 4A and 4B are provided to show an experiment using microscope slides to demonstrate the viability of using dewetting coatings to form fluid flow channels. Controlled fluid flow is demonstrated using two glass microscope slides placed over each other with a spacer in between. The glass slides are cleaned with isopropyl alcohol. A dewetting coating (water contact angle 120°) is applied on a glass microscope slide in a defined pattern. A corresponding pattern is applied on a second glass slide. A spacer of about 150 μm is placed between the slides and the top slide is placed such that the dewetting patterns on both the slides correspond. Colored water is injected on one side and flows through the. The water flows only in the regions where there is no coating. FIG. 4A illustrates the glass slides before injecting water and FIG. 4B after injecting showing the controlled flow of water. One will notice the the fluid flowed was confined to the defined channel path using the coatings with no need to form a trench as is typically done.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
   a substrate having a hollow defining space into which a die having a fluidic channel is positioned for processing fluids, wherein the die is positioned in the space so that a top surface thereof is flush with a top surface of the substrate;
   a first coating patterned on the substrate;
   a cover fit over the substrate;
   a second coating patterned on the cover, wherein the first coating and the second coating define a fluid flow path;
   a plurality of fluid inlet ports provided on an edge of the substrate and in line with the fluid flow path; and
   a spacer between the substrate and the cover,
   wherein the coating patterned on the substrate and the coating patterned on the cover respectively comprise a wetting coating within the fluid flow path and the wetting coating comprises functionalized nanoparticles including any of silica in epoxy resin or titania.

2. An apparatus, comprising:
   a substrate having a hollow defining a space, the substrate having a plurality of fluid inlet ports on an edge thereof into which a fluid may be introduced;
   a first coating comprising a first wetting coating on the substrate;
   a cover over the substrate;
   a second coating comprising a second wetting coating on the cover,
   wherein the first wetting coating and the second wetting coating define a plurality of fluid flow paths adjacent to the fluid inlet ports;
   a die configured to process fluids and positioned in the space such that a top surface of the die is flush with a top surface of the substrate;
   wherein the die has a fluidic channel which is in line with the fluid flow paths.

3. The apparatus of claim 2, further comprising an inlet port between the substrate and the cover.

4. The apparatus of claim 3, wherein the inlet port is at a vertical side edge between the substrate and the cover.

5. The apparatus of claim 2, wherein the fluid flow path defines a path from the inlet port to the die for carrying the fluids to the die.

6. The apparatus of claim 2, further comprising a spacer between the substrate and the cover.

7. An apparatus, comprising:
   a substrate having a space;
   a plurality of fluidic inlets provided on an edge of the substrate into which a fluid is introduced,
   a die for processing the fluid, the die having a plurality of first fluidic channels, wherein the die is positioned in the space such that a top surface thereof is flush with a top surface of the substrate;
   a first coating patterned on the substrate defining one or more second fluidic channels in direct fluidic communication with the first fluidic channel;
   a cover fit over the substrate;
   a second coating patterned on the cover and which corresponds to the first coating, the second coating defining one or more third fluidic channels in direct fluidic communication with the fluidic inlets; and a spacer between the substrate and the cover such that the second fluidic channels and the third fluidic channels define fluidic flow paths from the fluidic inlets to the fluidic channel of the die for carrying the fluid to the die.

8. An apparatus of claim 7, wherein the first coating and the second coating each comprise a wetting coating.

9. The apparatus of claim 8, wherein the wetting coating comprises nanoparticles including silica or titania.

10. The apparatus of claim 8, wherein the wetting coating comprises functionalized nanoparticles including any of silica in epoxy resin or titania.

11. The apparatus of claim 8, wherein the wetting coatings comprise silanes with hydrophilic end groups including any of carboxylic acid or hydroxyl.

12. The apparatus of claim 7, wherein the first coating and the second coating each comprise a dewetting coating.

13. The apparatus of claim 12, wherein the dewetting coating comprises one of alkoxysilanes and alkanethiolates.

14. The apparatus as recited in claim 13, wherein the alsoxysilanes comprise any of octadecyltrichlorosilane, heptadecafluoro 1,1,2,2, tetrahydrodecyl trichlorosilane.

15. The apparatus as recited in claim 13, wherein the alkanethiolates comprise n-alkanethiol.

16. The apparatus of claim 7, wherein the cover is transparent to light.

17. The apparatus as recited in claim 16, wherein the cover comprises one of clear quartz, polyester, polycarbonate, or poly(methyl methacrylate).

18. The apparatus of claim 7, wherein the fluids comprise biological fluids and the die comprises:

CMOS and MEMS circuits for processing the biological fluids.

* * * * *